United States Patent
Miyamoto et al.

(10) Patent No.: US 8,604,636 B2
(45) Date of Patent: Dec. 10, 2013

(54) POWER GENERATOR

(75) Inventors: Yasuhiro Miyamoto, Kitakyushu (JP); Shinichi Nishi, Kitakyushu (JP); Masayuki Utsunomiya, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

(21) Appl. No.: 13/603,420

(22) Filed: Sep. 5, 2012

(65) Prior Publication Data

US 2013/0270833 A1     Oct. 17, 2013

(30) Foreign Application Priority Data

Apr. 12, 2012   (JP) ................................. 2012-091186

(51) Int. Cl.
    *F03D 9/00*     (2006.01)
(52) U.S. Cl.
    USPC ............................................. 290/55; 290/44
(58) Field of Classification Search
    USPC .............................. 290/44, 55; 416/25, 170 R
    IPC .......... F03D 7/00; Y02E 10/72; H02P 2009/004
    See application file for complete search history.

(56) References Cited

U.S. PATENT DOCUMENTS

| | | | | | |
|---|---|---|---|---|---|
| 4,333,018 | A | * | 6/1982 | Bottrell .......................... | 290/55 |
| 5,083,039 | A | * | 1/1992 | Richardson et al. ........... | 290/44 |
| 5,126,641 | A | * | 6/1992 | Putman et al. ................. | 318/128 |
| 7,227,276 | B2 | * | 6/2007 | Caiozza .......................... | 290/55 |
| 2010/0230967 | A1 | * | 9/2010 | Heo ................................ | 290/44 |

FOREIGN PATENT DOCUMENTS

JP       2011-208635        10/2011

* cited by examiner

*Primary Examiner* — Vanessa Girardi
(74) *Attorney, Agent, or Firm* — Ditthavong Mori & Steiner, P.C.

(57) ABSTRACT

A power generator according to an embodiment includes a rotor shaft, a slip ring, a detecting shaft, and a position sensor. The rotor shaft through which wires from a propeller are inserted rotates with the propeller. The slip ring is coupled to the rotor shaft at one end. The detecting shaft is provided at the other end of the slip ring and rotates along with the rotor shaft. The position sensor detects the rotational position of the detecting shaft, thereby detecting the rotational position of the propeller.

16 Claims, 5 Drawing Sheets

POWER GENERATOR

CROSS-REFERENCE TO RELATED APPLICATION

This application is based upon and claims the benefit of priority of the prior Japanese Patent Application No. 2012-091186, filed on Apr. 12, 2012, the entire contents of which are incorporated herein by reference.

FIELD

Embodiments discussed herein are directed to a power generator.

BACKGROUND

A propeller power generator that generates electrical power by rotating a propeller with wind, ocean current, and other fluids has been known. A wind power generator, for example, converts mechanical energy of a propeller that rotates by receiving wind into electrical energy by using a generator.

A propeller power generator may include a position sensor such as an encoder that detects the rotational position of a propeller of the generator. Some power generators of related art have such a position sensor onto a propeller shaft. The position sensor detects the rotational position of the propeller shaft, thereby detecting the rotational position of the propeller. (Refer to Japanese Patent Application Laid-open No. 2011-208635, for example.)

However, the propeller shaft generally has a large shaft diameter, which may cause the position sensor to become larger when installed on the propeller shaft.

SUMMARY

A power generator according to an aspect of an embodiment includes: a rotor shaft, a slip ring, a detecting shaft, and a position sensor. The rotor shaft through which a wire from a propeller is inserted rotates with the propeller. The slip ring has one of its ends coupled to the rotor shaft. The detecting shaft provided at another end of the slip ring rotates along with the rotor shaft. The position sensor detects the rotational position of the detecting shaft, thereby detecting the rotational position of the propeller.

BRIEF DESCRIPTION OF DRAWINGS

The present invention can be appreciated more completely and advantages thereof can be easily understood in the description of embodiments below with reference to the accompanying drawings.

DESCRIPTION OF EMBODIMENTS

With reference to the accompanying drawings, embodiments of a power generator disclosed in the present application will be described in detail hereinafter. In the embodiments below, an example is described where a power generator disclosed in the present application is applied to a wind power generator. However, the power generator disclosed in the present application can be also applied to a propeller power generator in addition to wind power generators. The power generator disclosed in the present application can be also applied to a tidal power generator, for example, which generates electrical power by rotating a propeller with ocean current.

Figure 1:
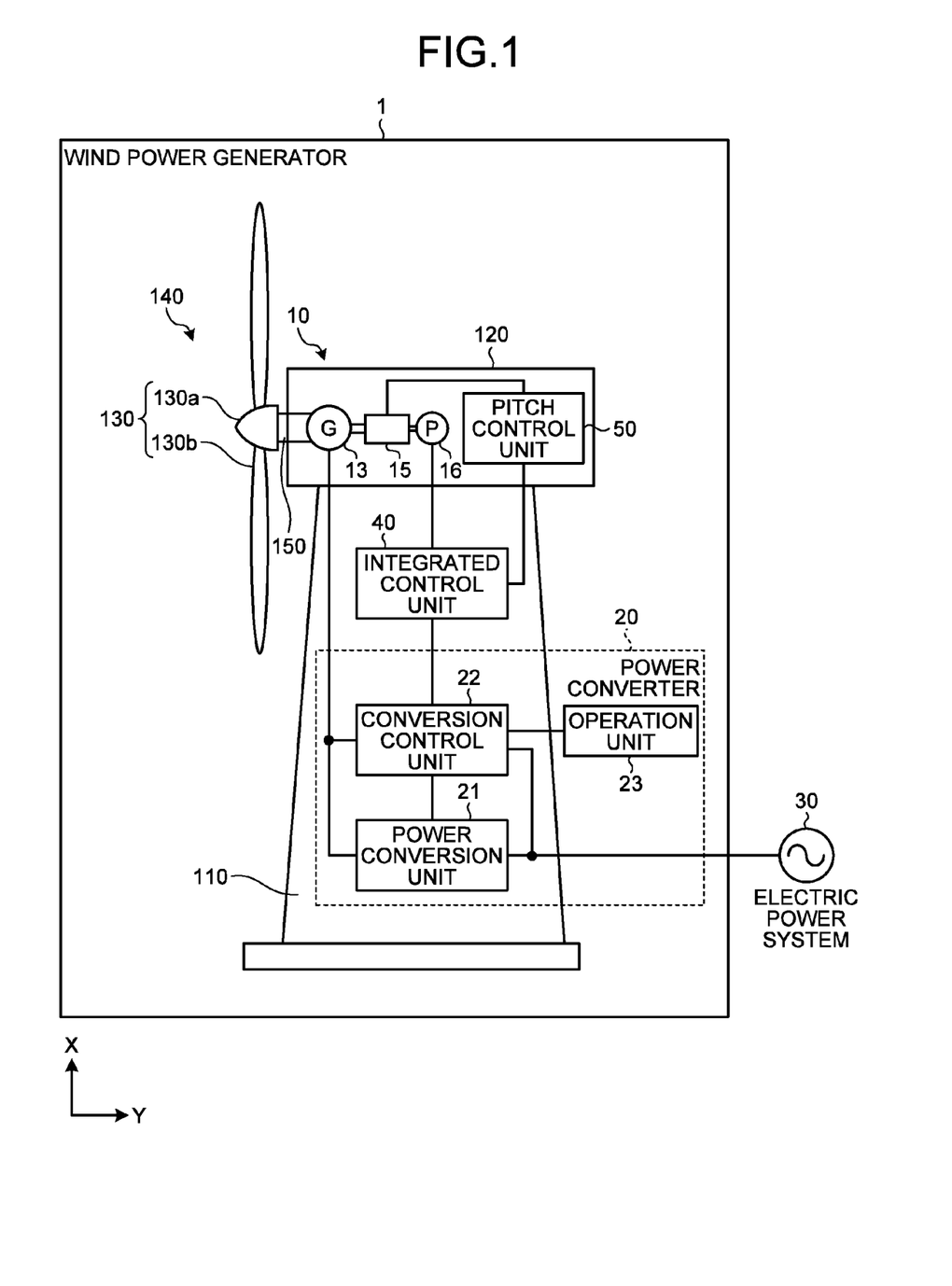
FIG. 1 is a diagram illustrating a structure of a wind power generator according to a first embodiment.

FIG. 1 is a diagram illustrating a structure of a wind power generator according to a first embodiment. As illustrated in FIG. 1, a wind power generator 1 includes a wind power generating unit 10 and a power converter 20 so as to provide electrical power to an electric power system 30. In order to be understood easily, some part of the structure is omitted from FIG. 1. In order to clarify a positional relationship in the following description, X and Y axes perpendicular to each other are specified. The positive direction in the X axis indicates the vertical upward direction.

The wind power generating unit 10 includes a tower body 110, a windmill 140 having a nacelle 120 and a propeller 130. The propeller 130 includes a hub 130a and a plurality of blades 130b installed on different positions on the hub 130a.

The plurality of blades 130b are provided with a pitch angle thereof variable. The pitch angle refers to an angle formed by a plane of rotation of the propeller 130 and a chord of the blade 130b. When the pitch angle becomes smaller, an area of the blade 130b receiving the wind becomes larger. In other words, because the drag of the blade 130b due to the wind becomes larger, a larger amount of energy can be obtained from the wind.

The nacelle 120 is rotatably supported by the tower body 110. The nacelle 120 accommodates a generator coupled to the propeller 130, through the propeller shaft 150. The generator 13 is a rotating electrical machine that can be used as a motor, such as a permanent magnet rotating electrical machine. The propeller shaft 150 is coupled to the hub 130a of the propeller 130.

The electrical power generated by the generator 13 is output to the power converter 20, converted by the power converter 20, and supplied to the electric power system 30. The structure and operation of the power converter 20 will be described later.

The nacelle 120 also includes a position sensor 16 for detecting the rotational position of the propeller 130 rotated by wind power. In the first embodiment, the position sensor 16 is an absolute value encoder that detects an absolute position. Therefore, it can detect the present rotational position of the propeller 130 without returning to the origin even when the propeller 130 is rotated due to, for example, a strong wind during the power-off state.

The rotational position of the propeller 130 detected by the position sensor 16 is output to a pitch control unit 50 through an integrated control unit 40. After obtaining the rotational position of the propeller 130 through the integrated control unit 40, the pitch control unit 50 performs pitch control processing in which the pitch angle of each blade 130b is changed according to the rotational position of the propeller 130. Specific operations of the integrated control unit 40 and the pitch control unit 50 will be described later.

The shaft diameter of the propeller shaft is usually formed somewhat larger from the viewpoint of strength or power generation efficiency. This may cause the position sensor to become larger when installing the position sensor for detecting the rotational position of the propeller to the propeller shaft, in order to detect the rotational position of the propeller by detecting the rotational position of the propeller shaft.

In addition, when the shaft diameter becomes larger, the transmittable torque increases. This may put a large amount of mechanical stress onto the position sensor when installing the position sensor to the propeller shaft having a large shaft diameter.

The propeller 130 includes some devices such as a pitch drive unit that varies the pitch angle of the blade 130b by driving the blade 130b. The nacelle 120 also accommodates a slip ring 15 for supplying electrical power to the devices.

Specifically, the wind power generator 1 includes a rotor shaft coupled to the propeller 130. Wires are inserted through the rotor shaft to which the slip ring 15 is installed. The slip ring 15 has a rotating unit to which wires from the propeller 130 are connected, and a fixed unit that is electrically coupled to the rotating unit. Wires from the propeller 130 are connected to external wires through the rotating unit and the fixed unit of the slip ring 15. This makes sending or receiving electrical power and signals possible between the devices rotating with and in the propeller 130 and external devices not rotating.

Accordingly, the wind power generator 1 includes the rotor shaft rotating with the propeller 130 in addition to the propeller shaft 150. Therefore, in the wind power generator 1 according to the first embodiment, the rotational position of the propeller 130 is designed to be detected by detecting the rotational position of the rotor shaft by using the position sensor 16.

The rotor shaft has a smaller shaft diameter than that of the propeller shaft 150. This can downsize the position sensor 16 compared with an example where the rotational position of the propeller shaft 150 is detected, thereby reducing the mechanical stress onto the position sensor 16.

Figure 2:
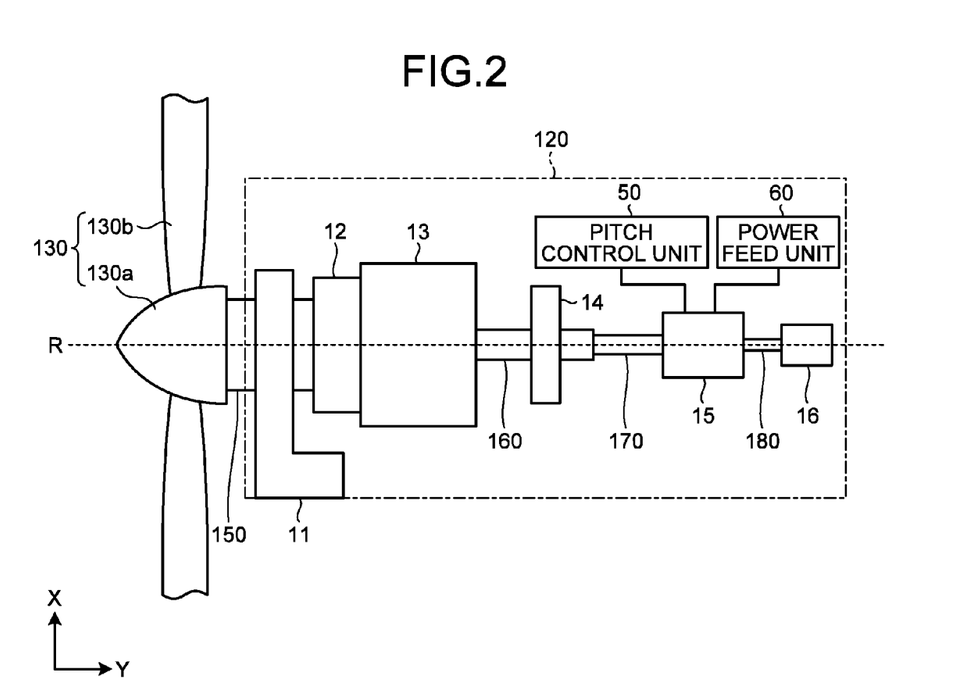
FIG. 2 is a schematic side view illustrating an arrangement of devices in a nacelle.

Hereinafter, the arrangement and the relation of connection of the position sensor 16 will be described in detail. FIG. 2 is a schematic side view illustrating an arrangement of devices in the nacelle 120.

As illustrated in FIG. 2, the nacelle 120 accommodates a bearing 11, a speed-increasing gear 12, a brake 14, an output shaft 160, a rotor shaft 170, a detecting shaft 180 in addition to the generator 13, the slip ring 15, and the position sensor 16 described above.

The bearing 11, the speed-increasing gear 12, the generator 13, the brake 14, the slip ring 15, and the position sensor 16 are arranged in this order from the closest side to the propeller 130. Hereinafter, one side where the propeller 130 is provided is defined as the front of the wind power generator 1, while another side where the position sensor 16 is provided is defined as the rear of the wind power generator 1.

In the wind power generator 1 according to the first embodiment, an input shaft and an output shaft of the speed-increasing gear 12, an input shaft of the generator 13, the rotor shaft 170, and the detecting shaft 180 are arranged coaxially with the central axis R of the propeller shaft 150 (i.e., the rotational axis of the propeller 130). This can downsize the nacelle 120 accommodating these devices. "coaxially" is not strictly necessary. That is, these shafts may have slightly offset from each other. The same shall apply hereinafter.

The bearing 11 is, for example, a member supporting the propeller shaft 150 rotatably by using a roller bearing, for example. The speed-increasing gear 12 increases and outputs the rotational speed of the propeller shaft 150 to which the input shaft of the speed-increasing gear 12 is coupled to the propeller shaft 150. The input shaft and the output shaft of the speed-increasing gear 12 are arranged coaxially with the central axis R of the propeller shaft 150.

In the first embodiment, the output shaft 160 illustrated in FIG. 2 corresponds to the output shaft of the speed-increasing gear 12. More specifically, in the first embodiment, an example is described where the output shaft 160 of the speed-increasing gear 12 is also the input shaft of the generator 13 and passes through and extends rearward of the generator 13. The present invention is, however, not limited to this example and the output shaft of the speed-increasing gear 12 may be formed separately from the input shaft of the generator 13.

The generator 13 generates electrical power by using an output from the speed-increasing gear 12. Specifically, the generator 13 converts the rotational energy that is input from the output shaft 160 of the speed-increasing gear 12 into electrical energy. Similar to the speed-increasing gear 12, the input shaft of the generator 13 (i.e., the output shaft 160) is arranged coaxially with the propeller shaft 150. A specific structure of the speed-increasing gear 12 and the generator 13 will be described later with reference to FIG. 4.

The brake 14 is provided on a part of the output shaft 160 extending rearward of the generator 13. The brake 14 stops rotation of the propeller 130 by stopping rotation of the output shaft 160 with friction generated by the contact between the brake 14 and the output shaft 160. The brake 14 operates according to a command from the integrated control unit 40 (refer to FIG. 1), for example.

Figure 3:
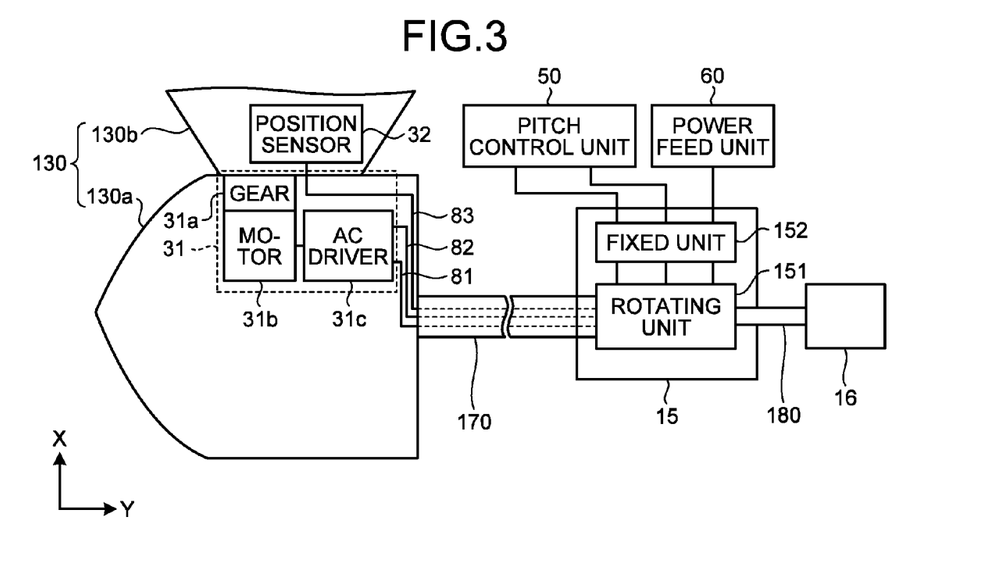
FIG. 3 is a schematic diagram illustrating a relationship between a propeller and a slip ring.

The slip ring 15 is a current collector for sending or receiving electrical power and signals between the pitch drive unit or other devices in the propeller 130 and external devices. The slip ring 15 is coupled to the propeller 130 through the rotor shaft 170. The relation of connection between the propeller 130 and the slip ring 15 will be described with reference to FIG. 3. FIG. 3 is a schematic diagram illustrating a relationship between the propeller 130 and the slip ring 15.

In order to be understood easily, only one of the blades 130b is illustrated in FIG. 3. Furthermore, only devices and wires provided corresponding to the single blade 130b are illustrated in FIG. 3, while devices and wires provided corresponding to other blades 130b are omitted.

As illustrated in FIG. 3, the hub 130a of the propeller 130 includes a pitch drive unit 31 that varies the pitch angle of the blade 130b according to the command from the pitch control unit 50. The blade 130b includes a position sensor 32.

The pitch drive unit 31 includes a gear 31a, a motor 31b, and an Alternate Current (AC) driver 31c. The pitch drive unit 31 drives the motor 31b by using the AC driver 31c. Rotation of the motor 31b rotates the gear 31a, thereby rotating the blade 130b coupled to the gear 31a. This changes the pitch angle of the blade 130b. The position sensor 32 is an absolute value encoder, for example, which detects and outputs the present pitch angle of the blade 130b to the pitch control unit 50.

The AC driver 31c includes a power feed cable and a signal wire 82, while the position sensor 32 includes a signal wire 83. The power feed cable 81 and the signal wires 82, 83 are coupled to the rotating unit 151 of the slip ring 15.

A fixed unit 152 of the slip ring 15 is coupled to the pitch control unit 50 and a power feed unit 60. The fixed unit 152 is structured so as to maintain electrical connection with the rotating unit 151 even while the rotating unit 151 is rotating with the propeller 130.

Accordingly, the pitch drive unit 31 and the position sensor 32 in the propeller 130 are electrically coupled to the pitch control unit 50 and the power feed unit 60 through the rotating unit 151 and the fixed unit 152 of the slip ring 15. A specific structure of the slip ring 15 will be described later with reference to FIG. 5.

The pitch control unit 50 obtains pitch angle information of the blade 130b from the position sensor 32 through the signal wire 83 and the slip ring 15, and sends a control signal to the AC driver 31c through the slip ring 15 and the signal wire 82. The power feed unit 60 supplies electrical power to the AC driver 31c through the slip ring 15 and the power feed cable 81.

As described above, providing the slip ring 15 can electrically couple the pitch drive unit 31 and the position sensor 32 that are on the rotating unit side to the pitch control unit 50 and the power feed unit 60 on the fixed unit side.

As illustrated in FIG. 3, the power feed cable 81 and the signal wires 82, 83 are inserted through inside the rotor shaft 170 so as to be coupled to the rotating unit 151 of the slip ring 15. The rotor shaft 170 is arranged coaxially with the propeller shaft 150 (refer to FIG. 2) with one of its ends being secured to the propeller 130 and the other end being coupled to the rotating unit 151 of the slip ring 15.

That is, the rotating unit 151 of the slip ring 15 is coupled to the propeller 130 through the rotor shaft 170, whereby the rotating unit 151 rotates integrally with, and coaxially with the propeller 130.

In the wind power generator 1 according to the first embodiment, the detecting shaft 180 is provided on the rear side of the rotating unit 151 of the slip ring 15. The rotational position of the propeller 130 can be detected by detecting the rotational position of the detecting shaft 180 by using the position sensor 16.

The detecting shaft 180 has no wire inserted therethrough from the propeller 130, unlike the rotor shaft 170. Therefore, the detecting shaft 180 can be formed into solid having the similar strength to that of the rotor shaft 170, thereby reducing the shaft diameter than that of the rotor shaft 170. In the wind power generator 1 according to the first embodiment, the position sensor 16 is provided on the detecting shaft 180, whereby the position sensor 16 can be further downsized and the mechanical stress onto the position sensor 16 can be further reduced.

As illustrated in FIG. 3, the position sensor is coupled to the propeller 130 through only a shaft rotating at the same rotational speed as the propeller 130, without a transmission mechanism such as a speed-increasing gear or a reducer interposed therebetween. As a result, the position sensor 16 can accurately detect the rotational position of the propeller 130.

Figure 4:
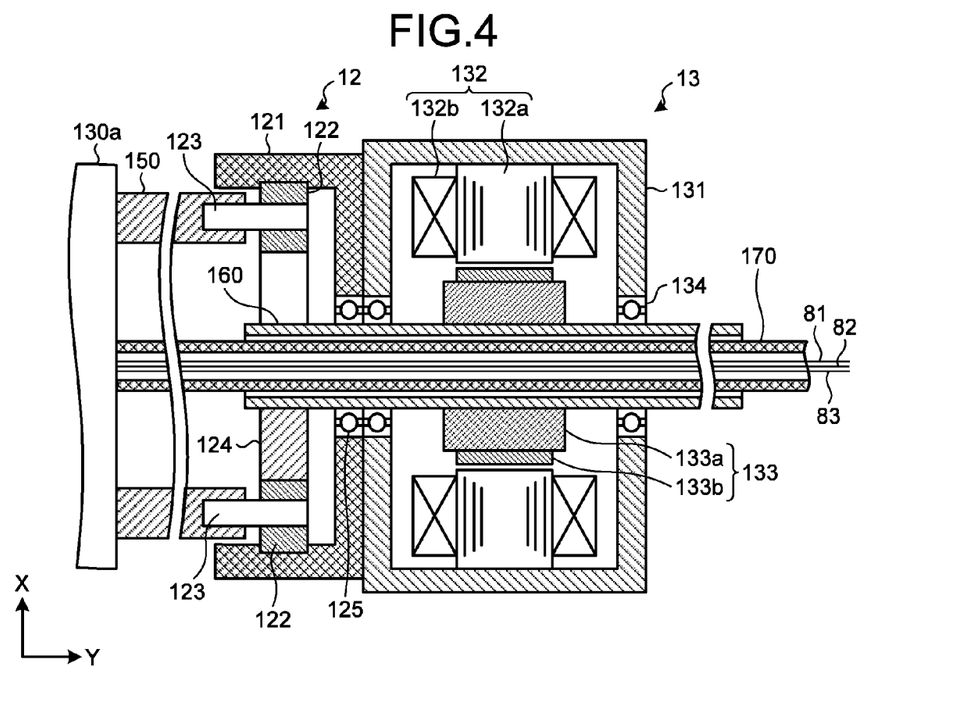
FIG. 4 is a schematic cross-sectional side view of a speed-increasing gear and a generator.

The relation of connection between the position sensor 16 and the propeller 130 will be described in greater detail, illustrating specific structure among the speed-increasing gear 12, the generator 13, the slip ring 15, and the like. Hereinafter, a relation of connection between the rotor shaft 170 and the propeller 130 will be described with reference to FIG. 4, followed by a relation of connection between the rotor shaft 170 and the position sensor 16 with reference to FIG. 5. FIG. 4 is a schematic cross-sectional side view of the speed-increasing gear 12 and the generator 13.

As illustrated in FIG. 4, the propeller shaft 150 is a hollow member having both open ends. The propeller shaft 150 is coupled to the hub 130a of the propeller 130 at the front end, and rotates with the propeller 130. The propeller shaft 150 is a shaft for transmitting the rotation of the propeller 130 to the input shaft of the speed-increasing gear 12. The propeller shaft 150 herein is defined as a propeller shaft extending from one end coupled to the hub 130a to the other end coupled to the input shaft of the speed-increasing gear 12. "hollow shape" is not limited to the shape shown in the embodiment. The same shall apply hereinafter.

The speed-increasing gear 12 has a frame 121 formed in a tubular shape and includes therein a ring 122, a coupling shaft 123, a planetary gear 124, and a bearing 125. The frame 121 is secured to the nacelle 120 by a support (not illustrated), for example.

The ring 122 is an input shaft of the speed-increasing gear 12. The ring 122 is secured to the propeller shaft 150 through the coupling shaft 123, and has the same central axis as the central axis R of the propeller shaft 150 (refer to FIG. 2). The ring 122 is fitted into a groove in the frame 121 rotatably. The planetary gear 124 is arranged rotatably between an inner periphery of the ring 122 and an outer periphery of the output shaft 160.

The output shaft 160 is an output shaft of the speed-increasing gear 12, having a smaller shaft diameter than that of the propeller shaft 150, and has the same central axis as that of the propeller shaft 150. The output shaft 160 is rotatably supported by the bearing 125 secured to the frame 121.

In the speed-increasing gear 12 structured as described above, the ring 122 rotates along with the rotation of the hub 130a of the propeller 130. Along with the rotation of the ring 122, the planetary gear 124 rotates on its axis, and rotates around the output shaft 160. Rotation of the planetary gear 124 rotates the output shaft 160.

As a result, the rotational speed of the propeller shaft 150 (i.e., the rotational speed of the propeller 130) is increased by the speed-increasing gear 12 and output from the output shaft 160. Accordingly, the output shaft 160 rotates at a higher speed than the propeller 130.

An example is described where the speed-increasing gear 12 has a one-stage planetary gear mechanism, however, the speed-increasing gear 12 may have a multistage planetary gear mechanism. The multistage planetary gear mechanism can rotate the output shaft 160 at a higher speed increasing ratio.

The speed-increasing gear 12 described above is a planetary gear type, however, the present invention is not limited to this example. The speed-increasing gear 12 may be a planetary roller type, for example. Because the planetary gear mechanism or the planetary roller mechanism can distribute the load to its planetary gear or planetary roller, abrasion, gear crack, and other defects are relatively unlikely to occur. Therefore, constituting the speed-increasing gear 12 only with a planetary gear mechanism or a planetary roller mechanism can increase the reliability of the wind power generator 1.

In a planetary type speed-increasing gear, an input shaft and an output shaft can be arranged coaxially. As a result, constituting the speed-increasing gear 12 with a planetary gear mechanism or a planetary roller mechanism, the propeller shaft 150, the speed-increasing gear 12, the generator 13, the slip ring 15, and the position sensor 16 can be arranged coaxially. Furthermore, as described later, the rotor shaft 170 arranged coaxially with the propeller shaft 150 can be inserted through a hollow part of the output shaft 160 so as to be coupled to the propeller 130.

An example is described where the propeller shaft 150 is couple to the ring 122, however, the propeller shaft 150 may be coupled to the planetary gear 124 through a coupling shaft. In this case, the planetary gear 124 serves as the input shaft of the speed-increasing gear 12.

The generator 13 generates electrical power by using the rotation of the output shaft 160. The generator 13 includes a frame 131, a stator 132, a rotor 133, and a bearing 134.

The frame 131 is formed in a tubular shape, for example, and secured to the nacelle 120 by a support (not illustrated). The bearing 134 supporting the output shaft 160 rotatably is secured to the frame 131.

In the first embodiment, the output shaft 160 extends rearward of the generator 13 in order to install the brake 14, however, the output shaft 160 does not need to extend rearward of the generator 13. In this case, the wind power generator 1 may have a brake on the propeller shaft 150, whereby the brake stops the rotation of the propeller shaft 150 so as to stop the propeller 130.

On the inner periphery of the frame 131 of the generator 13, the stator 132 is fastened. The stator 132 includes a stator core 132a and a stator coil 132b. On the inner periphery side of the stator 132, the rotor 133 is arranged opposite to the stator 132 with a gap interposed therebetween. The rotor 133 includes a tubular rotor core 133a provided on the outer periphery of the output shaft 160 and a plurality of permanent magnets 133b arranged along the outer periphery of the rotor core 133a, and rotates coaxially with the output shaft 160.

In the generator 13 structured as described above, the rotor 133 rotates along with the rotation of the output shaft 160, thereby generating electric current on the stator coil 132b of the stator 132.

The frame 131 of the generator 13 is secured to the frame 121 of the speed-increasing gear 12. That is, the frame 131 of the generator 13 is formed integrally with the frame 121 of the speed-increasing gear 12. In other words, the generator 13 is structured so that the output shaft 160 that is the output shaft of the speed-increasing gear 12 and also the input shaft of the generator 13 is not exposed to the outside between the speed-increasing gear 12 and the generator 13 (i.e., covered by the frame 121 and the frame 131).

As described above, by forming the generator 13 integrally with the speed-increasing gear 12, that is, by making the generator 13 with a speed-increasing gear, the nacelle 120 accommodating the generator 13 and the speed-increasing gear 12 can be downsized.

The output shaft 160 is a hollow member having both open ends and arranged coaxially with the propeller shaft 150 as described above. In the wind power generator 1 according to the first embodiment, the rotor shaft 170 is inserted through the hollow part of the output shaft 160.

The rotor shaft 170 is arranged coaxially with the propeller shaft 150 and the output shaft 160, and inserted through the hollow part of the output shaft 160 (i.e., the hollow part of the speed-increasing gear 12 and the generator 13) and the hollow part of the propeller shaft 150 so as to be secured to the hub 130a of the propeller 130.

The rotor shaft 170 is formed in a hollow shape having both open ends. Through the rotor shaft 170, the wires from the propeller 130 (the power feed cable 81, the signal wires 82, 83 and the like) are inserted.

The rotor shaft 170 is coupled to the rotating unit 151 of the slip ring 15 at the other end. The position sensor 16 according to the first embodiment is coupled to the rotor shaft 170 through the rotating unit 151 of the slip ring 15 and the detecting shaft 180.

Figure 5:
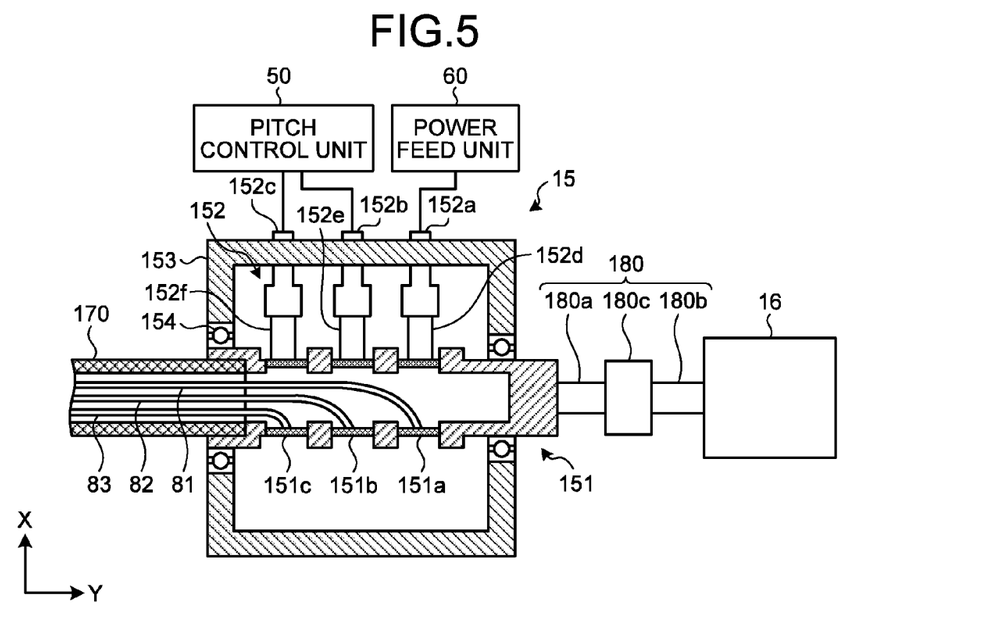
FIG. 5 is a schematic cross-sectional side view of the slip ring.

Hereinafter, the relation of connection between the rotor shaft 170 and the position sensor 16 will be described in greater detail with reference to FIG. 5, illustrating a structure of the slip ring 15 and the detecting shaft 180. FIG. 5 is a schematic cross-sectional side view of the slip ring 15.

As illustrated in FIG. 5, the slip ring 15 includes the rotating unit 151, the fixed unit 152, a frame 153, and a bearing 154. The frame 153 is secured to the nacelle 120 by a support (not illustrated), for example.

The rotating unit 151 is a tubular member in a hollow shape, having an open front end. The rotating unit 151 is coupled to the rotor shaft 170 at the front end, and has the same central axis as that of the rotor shaft 170. The rotating unit 151 is rotatably supported by the bearing 154 secured to the frame 153. Accordingly, the rotating unit 151 rotates integrally with the propeller 130 and the rotor shaft 170.

In the rotating unit 151, the collector rings 151a, 151b, 151c are provided to which the power feed cable 81 and the signal wires 82,83 inserted through the hollow part of the output shaft 160 are coupled respectively.

The fixed unit 152 includes terminals 152a, 152b, 152c secured to the frame 153 and brushes 152d, 152e, 152f provided to the terminals 152a, 152b, 152c, respectively.

The brushes 152d, 152e, 152f are retained while being contacted with the collector rings 151a, 151b, 151c respectively. As a result, even while the rotating unit 151 is rotating, electrical connection between the collector rings 151a, 151b, 151c, and the brushes 152d, 152e, 152f are maintained. The terminal 152a is coupled to the power feed unit 60, while the terminals 152b and 152c are coupled to the pitch control unit 50.

In the slip ring 15 structured as described above, the rotating unit 151 rotates integrally with the rotor shaft 170 and the propeller 130, and the brushes 152d, 152e, 152f of the fixed unit 152 slidingly contact with the collector rings 151a, 151b, 151c of the rotating unit 151 that is rotating. As a result, the pitch drive unit 31 and the position sensor 32 arranged in the propeller 130 (refer to FIG. 3) are electrically coupled to the pitch control unit 50 or the power feed unit 60.

An example is illustrated where three collector rings, three terminals, and three brushes are provided to the slip ring 15 in FIG. 5, however, the numbers of the collector rings, terminals, and brushes provided to the slip ring 15 are not limited to the example illustrated in FIG. 5.

As described above, the rotating unit 151 of the slip ring 15 is coupled to the rotor shaft 170 at one end, and rotates integrally with the rotor shaft 170 and the propeller 130.

At the other end of the rotating unit 151, the detecting shaft 180 having a smaller shaft diameter than the rotor shaft 170 is coupled. The detecting shaft 180 is arranged coaxially with the propeller shaft 150, the rotor shaft 170, and the rotating unit 151.

The detecting shaft 180 includes a first shaft 180a, a second shaft 180b, and a shaft coupling 180c. The first shaft 180a is secured to the rotating unit 151, while the second shaft 180b is secured to the position sensor 16. The first shaft 180a and the second shaft 180b are coupled by the shaft coupling 180c so as to have the same central axis.

As described above, the detecting shaft 180 is arranged coaxially with the rotor shaft 170 and the rotating unit 151, and rotates integrally with the rotating unit 151. The position sensor 16 can detect the rotational position of the propeller 130 by detecting the rotational position of the detecting shaft 180.

The rotational position of the propeller 130 detected by the position sensor 16 is output to the integrated control unit 40 from which, in turn, the information is output to the pitch control unit 50 and the power converter 20.

The power converter 20, the integrated control unit 40, and the pitch control unit 50 will be described with reference to FIG. 1 again. The power converter 20 includes a power conversion unit 21, a conversion control unit 22, and an operation unit 23. The power converter 20 is arranged in the tower body 110.

The power conversion unit 21 converts electrical power between the generator 13 of the wind power generating unit 10 and the electric power system 30 bidirectionally. A matrix converter, for example, can be used as the power conversion unit 21.

The conversion control unit 22 outputs a control signal to the power conversion unit 21 so as to perform generation control processing that enables the power conversion unit 21 to convert electrical power from the generator 13 to the electric power system 30. As a result, electrical power generated by the generator 13 is converted from DC to DC by the power conversion unit 21 and supplied to the electric power system 30.

The conversion control unit 22 outputs a control signal to the power conversion unit 21 so as to enable the power conversion unit 21 to convert electrical power from the electric power system 30 to the generator 13. Accordingly, the conversion control unit 22 also performs propeller position control processing that controls the rotational position of the propeller 130 by using the generator 13 as a motor. The propeller position control processing is performed based on an operation to the operation unit 23 during replacement of the blade 130b, for example.

More specifically, the conversion control unit generates the control signals so as to match the rotational position of the propeller 130 to an objective position, based on the rotational position of the propeller 130 detected by the position sensor 16 and the objective position specified by the operation to the operation unit 23. Then, the conversion control unit 22 outputs the control signal thus generated to the power conversion unit 21. As a result, the rotational position of the propeller 130 can be set to a preset objective position for each blade 130b, a position where each blade 130b can be installed or removed easily, for example.

As described above, the conversion control unit 22 outputs the control signals to the power conversion unit 21 so as to enable the power conversion unit 21 to convert electrical power bidirectionally between the generator 13 and the electric power system 30, thereby performing generation control processing or propeller position control processing.

The wind power generator 1 further includes integrated control unit 40 and the pitch control unit 50 so as to perform pitch control processing in which the pitch angle of the blade 130b are changed according to a position of the blade 130b, based on the rotational position of the propeller 130 that is output from the position sensor 16. The integrated control unit 40 is provided in the tower body 110, for example, while the pitch control unit 50 is provided in the nacelle 120, for example.

The integrated control unit 40 obtains the rotational position of the propeller 130 from the position sensor 16, and outputs the rotational position information thus obtained to the pitch control unit 50. As described above, the rotational position of the propeller 130 detected by the position sensor 16 is input to the pitch control unit 50 through the integrated control unit 40.

After obtaining the rotational position of the propeller 130 detected by the position sensor 16 through the integrated control unit 40, the pitch control unit 50 generates a pitch angle change command for each blade 130b according to the rotational position of the propeller 130, and changes the pitch angle of each blade 130b based on the pitch angle change command thus generated.

As described above, the wind power generator 1 according to the first embodiment includes the rotor shaft 170, the slip ring 15, the detecting shaft 180, and the position sensor 16. The rotor shaft 170 through which the wires from the propeller 130 are inserted rotates integrally with the propeller 130. The slip ring 15 is coupled to the rotor shaft 170 at one end. The detecting shaft 180 is provided at the other end of the slip ring 15 and rotates along with the rotor shaft 170. The position sensor 16 detects the rotational position of the detecting shaft 180, thereby detecting the rotational position of the propeller 130.

In the wind power generator 1 according to the first embodiment, the rotational position of the detecting shaft 180 having a smaller shaft diameter than that of the propeller shaft 150 is detected by the position sensor 16. This can downsize the position sensor 16 compared with an example where the rotational position of the propeller shaft 150 is detected by the position sensor 16.

In addition, in the wind power generator 1 according to the first embodiment, the propeller shaft 150, the input shaft (the ring 122) and the output shaft 160 of the speed-increasing gear 12, the input shaft (i.e., the output shaft 160) of the generator 13, the rotor shaft 170, and the detecting shaft 180 are arranged coaxially. This can downsize the nacelle 120 where these devices are accommodated.

Furthermore, in the wind power generator 1 according to the first embodiment, the input shaft (ring 122) and the output shaft 160 of the speed-increasing gear 12, the input shaft (i.e., the output shaft 160) of the generator 13 are all formed in a hollow shape, so that the rotor shaft 170 is inserted in the hollow parts of the speed-increasing gear 12 and the generator 13. As a result, the devices can be more compactly arranged in the nacelle 120. Additionally, the rotor shaft 170 can be formed straight, whereby the central axis of the rotor shaft 170 can be easily aligned with the central axis R of the propeller shaft 150.

Furthermore, the position sensor 16 according to the first embodiment, is arranged, for example, in the rearmost position among the devices in the nacelle 120 as illustrated in FIG. 2. This facilitates installation, removal, or maintenance of the position sensor 16.

Finally, the rotor shaft 170 is provided on the propeller 130, thereby transmitting the rotation of the propeller 130 more directly to the position sensor 16.

In the first embodiment described above, an example is described where the rotor shaft 170 is provided on the propeller 130, however, the rotor shaft 170 does not need to be coupled to the propeller 130 directly.

Figure 6:
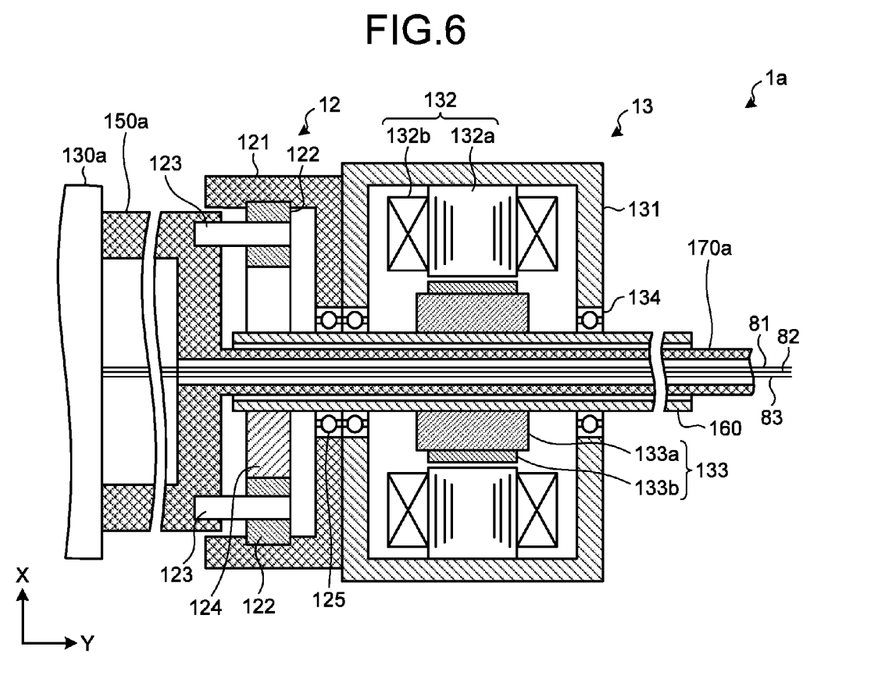
FIG. 6 is a schematic cross-sectional side view illustrating another structure of the rotor shaft.

Therefore, in a second embodiment, an example is described where the rotor shaft 170 is coupled to the propeller 130 indirectly with reference to FIG. 6. FIG. 6 is a schematic cross-sectional side view illustrating another structure of the rotor shaft 170. In the description below, components similar to the components that have already been described are designated by reference numerals similar to those of the components that have already been described, and overlapped explanation thereof will be omitted.

As illustrated in FIG. 6, in a wind power generator 1a according to the second embodiment, a rotor shaft 170a is provided on a propeller shaft 150a. The propeller shaft 150a and the rotor shaft 170a may be formed integrally with each other, or formed as a respective separate body to be coupled to each other thereafter.

Similar to the rotor shaft 170 according to the first embodiment, the rotor shaft 170a is arranged coaxially with the propeller shaft 150a to be coupled to the front side of a slip ring 15. The rotor shaft 170a is formed in a hollow shape.

Wires from a hub 130a (the power feed cable 81, the signal wires 82, 83, for example) are inserted through the propeller shaft 150a and the rotor shaft 170a to be coupled to the rotating unit 151 of the slip ring 15.

As described above, the rotor shaft 170a may be coupled to the propeller 130 through the propeller shaft 150a. Even in this example, the rotor shaft 170a rotates integrally with the hub 130a of the propeller 130 like the first embodiment, the rotational position of the propeller 130 can be detected by detecting the rotational position of the rotor shaft 170a by using the position sensor 16.

According to the wind power generator 1a according to the second embodiment, providing the rotor shaft 170a on the propeller shaft 150a facilitates axial alignment of the propeller shaft 150a and the rotor shaft 170a.

The present invention is not limited to the example illustrated in FIG. 6. The rotor shaft may be secured to both the propeller and the propeller shaft, or may be provided on the propeller or the propeller shaft with other members provided on the propeller or the propeller shaft interposed.

Figure 7:
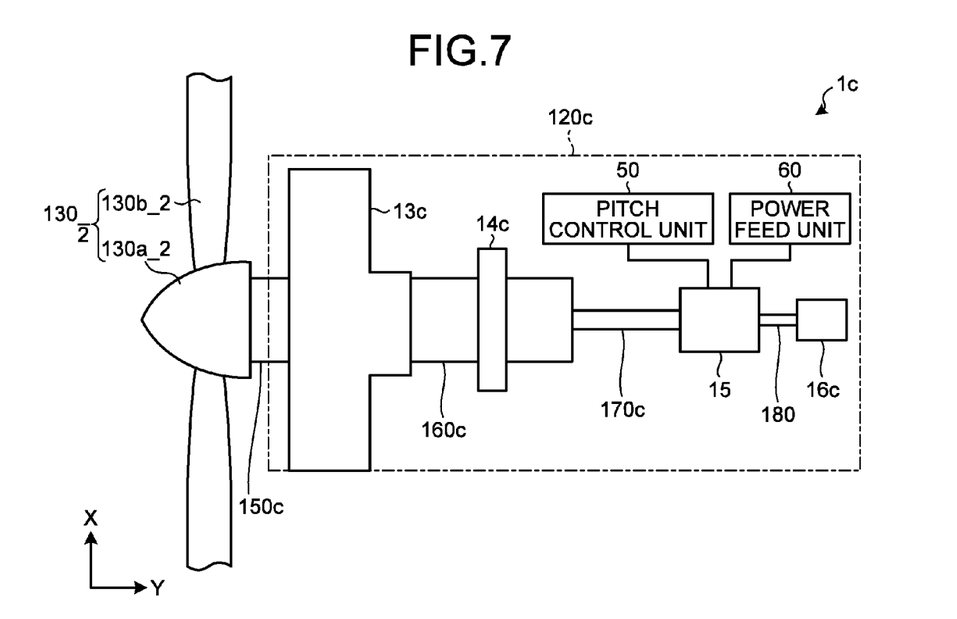
FIGS. 7 and 8 are schematic side views illustrating different structures of devices in the nacelle.
Figure 8:
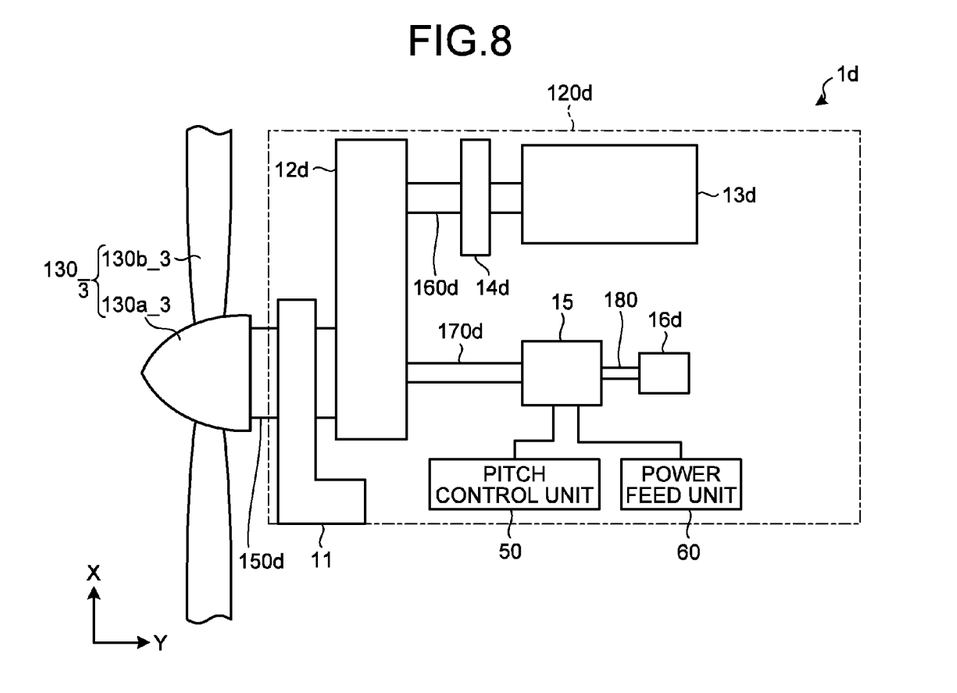

Furthermore, the structure of the wind power generating unit, that is, the structure of devices in the nacelle is not limited to the examples described in the embodiments. Hereinafter, other structures of the wind power generating unit will be described. FIG. 7 and FIG. 8 are schematic side views illustrating other structures of devices in the nacelle 120.

For example, as illustrated in FIG. 7, a wind power generator 1c may be a so-called direct drive wind power generator that directly transmits rotation of a propeller 130_2 to a generator 13c without interposing a speed-increasing gear. The wind power generator 1c according to this example (a third embodiment) does not include a speed-increasing gear, unlike the wind power generators 1 nor 1a according to the embodiments described above.

As illustrated in FIG. 7, the generator 13c, a brake 14c, the slip ring 15, and a position sensor 16c are arranged in this order from the closest side to the propeller 130_2.

The generator 13c is a type of a generator whose rated rotational speed is smaller than that of the generator 13 according to the embodiments described above. An output shaft 160c is an output shaft of the generator 13c, and formed integrally with a propeller shaft 150c, for example. The output shaft 160c is formed in a hollow shape. The output shaft 160c, a rotor shaft 170c, and the detecting shaft 180 are arranged coaxially with the propeller shaft 150c that is an input shaft of the generator 13c.

The rotor shaft 170c rotates integrally with the propeller 130_2 while being inserted through a hollow part of the output shaft 160c and a hollow part of the propeller shaft 150c. The rotor shaft 170c may be provided on a hub 130a_2 like the rotor shaft 170 according to the first embodiment, otherwise provided on the propeller shaft 150c like the rotor shaft 170a according to the second embodiment.

The position sensor 16c according to the third embodiment is coupled to the propeller 130_2 through the rotor shaft 170c, the slip ring 15, and the detecting shaft 180. Similar to the embodiments described above, the position sensor 16c according to the third embodiment detects the rotational position of the detecting shaft 180, thereby detecting the rotational position of the propeller 130_2.

As described above, the power generator disclosed in the present application can be applied to direct drive wind power generators.

As illustrated in FIG. 8, a wind power generator 1d may be a wind power generator where an input shaft of a generator 13d is not arranged coaxially with a propeller shaft 150d. In the wind power generator 1d, a speed-increasing gear 12d is structured so that a planetary speed-increasing gear and a gear pair with parallel axes are combined multistagedly, for example, so as to have a higher speed increasing ratio compared with that of the speed-increasing gear 12 described above.

An output shaft 160d is an output shaft of a speed-increasing gear 12d. The output shaft 160d is arranged along a different axis from the central axis of the propeller shaft 150d, unlike the wind power generators 1, 1a, 1c according to the embodiments described above. The generator 13d generates electrical power by rotation of the output shaft 160d to which it is coupled. The output shaft 160d has a brake 14d.

The propeller shaft 150d is coupled to a hub 130a_3 of a propeller 130_3 at one end, and coupled to an input shaft of a speed-increasing gear 12d at another end. The propeller shaft 150d and the input shaft of the speed-increasing gear 12d are both formed in a hollow shape, through which a rotor shaft 170d is inserted.

The rotor shaft 170d rotates integrally with the propeller 130_3 while being inserted through a hollow part of the propeller shaft 150d and a hollow part of the speed-increasing gear 12d. The rotor shaft 170d may be provided on a hub 130a_3 similar to the rotor shaft 170 according to the first embodiment, otherwise provided on the propeller shaft 150d similar to the rotor shaft 170a according to the second embodiment. The rotor shaft 170d and the detecting shaft 180 are arranged coaxially with the propeller shaft 150d.

A position sensor 16d according to the third embodiment is coupled to the propeller 130_3 through the rotor shaft 170d, the slip ring 15 and the detecting shaft 180. Similar to the embodiments described above, the position sensor 16d detects the rotational position of the detecting shaft 180, thereby detecting the rotational position of the propeller 130_3.

As described above, the power generator disclosed in the present application can be also applied to a type of a wind power generator where an input shaft of a generator is not arranged coaxially with a propeller shaft.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power generator comprising:
   a rotor shaft that rotates with a propeller and through which a wire from the propeller is inserted;
   a slip ring to which the rotor shaft is coupled at one end;
   a detecting shaft provided at another end of the slip ring, the detecting shaft rotating with the rotor shaft; and
   a position sensor that detects rotational position of the propeller by detecting rotational position of the detecting shaft.

2. The power generator according to claim 1, further comprising:
   a propeller shaft coupled to the propeller;
   a speed-increasing gear coupled to the propeller shaft; and
   a generator that generates electrical power by an output from the speed-increasing gear; wherein
   the propeller shaft, an input shaft and an output shaft of the speed-increasing gear, an input shaft of the generator, the rotor shaft, and the detecting shaft are arranged coaxially.

3. The power generator according to claim 2, wherein
an input shaft and an output shaft of the speed-increasing gear, and an input shaft of the generator are formed in a hollow shape;
the rotor shaft rotates with the propeller while being inserted through a hollow part of the speed-increasing gear and a hollow part of the generator.

4. The power generator according to claim 1, wherein the rotor shaft is provided on the propeller.

5. The power generator according to claim 2, wherein the rotor shaft is provided on the propeller.

6. The power generator according to claim 3, wherein the rotor shaft is provided on the propeller.

7. The power generator according to claim 1, wherein the rotor shaft is provided on the propeller shaft.

8. The power generator according to claim 2, wherein the rotor shaft is provided on the propeller shaft.

9. The power generator according to claim 3, wherein the rotor shaft is provided on the propeller shaft.

10. The power generator according to claim 1, wherein the generator is formed integrally with the speed-increasing gear.

11. The power generator according to claim 2, wherein the generator is formed integrally with the speed-increasing gear.

12. The power generator according to claim 3, wherein the generator is formed integrally with the speed-increasing gear.

13. The power generator according to claim 1, wherein the speed-increasing gear is a planetary gear box.

14. The power generator according to claim 2, wherein the speed-increasing gear is a planetary gear box.

15. The power generator according to claim 3, wherein the speed-increasing gear is a planetary gear box.

16. A power generator comprising:
a rotor shaft through which a wire is inserted from a propeller, the rotor shaft rotating with the propeller;
a slip ring coupled to the rotor shaft at one end;
a detecting shaft provided on the slip ring at another end, the detecting shaft rotating with the rotor shaft; and
a position detection unit that detects rotational position of the propeller by detecting rotational position of the detecting shaft.

* * * * *